(12) United States Patent
Xu et al.

(10) Patent No.: US 7,642,526 B2
(45) Date of Patent: Jan. 5, 2010

(54) DIRECTION CORRECTING APPARATUS, METHOD THEREOF AND MOVABLE RADIATION INSPECTING SYSTEM

(75) Inventors: Xining Xu, Beijing (CN); Shangmin Sun, Beijing (CN); Zhongrong Yang, Beijing (CN); Hua Peng, Beijing (CN); Guang Yang, Beijing (CN); Haifeng Hu, Beijing (CN); Zhijun Li, Beijing (CN)

(73) Assignees: Nuctech Company Limited, Haidian District, Beijing (CN); Tsinghua University, Haidian District, Beijing (CN)

( * ) Notice: Subject to any disclaimer, the term of this patent is extended or adjusted under 35 U.S.C. 154(b) by 156 days.

(21) Appl. No.: 12/030,748

(22) Filed: Feb. 13, 2008

(65) Prior Publication Data
US 2008/0197293 A1 Aug. 21, 2008

(30) Foreign Application Priority Data
Feb. 16, 2007 (CN) .................... 2007 1 0064027

(51) Int. Cl.
*G01N 23/00* (2006.01)
*G01N 23/083* (2006.01)
*H05G 1/02* (2006.01)
(52) U.S. Cl. ............ 250/491.1; 250/492.1; 378/57; 378/55; 378/196; 378/197; 378/198
(58) Field of Classification Search .......... 250/492.1, 250/491.1; 378/57, 55, 196, 197, 198
See application file for complete search history.

(56) References Cited

U.S. PATENT DOCUMENTS

| 6,937,692 | B2* | 8/2005 | Johnson et al. | 378/57 |
| 7,497,618 | B2* | 3/2009 | Chen et al. | 378/198 |
| 2008/0197293 | A1* | 8/2008 | Xu et al. | 250/491.1 |

* cited by examiner

*Primary Examiner*—Nikita Wells
(74) *Attorney, Agent, or Firm*—Osha • Liang LLP

(57) ABSTRACT

The present invention discloses direction correcting apparatus and method thereof for a movable radiation inspecting system having a moving device. The direction correcting apparatus comprises: a direction detecting device for detecting a moving direction of the moving device and generating a detecting signal indicating the moving direction; a direction control device for controlling the moving direction of the moving device; and a control unit for calculating a deviation value between the moving direction and the predetermined direction based on the detected signal received from the direction detecting device, and the direction control device is driven according to the deviation value to correct the moving direction to the predetermined direction. The direction correcting apparatus according to the present invention can automatically control the movable radiation inspecting system to move linearly in a predetermined direction during working, which enhances automatic control degree, and has a simple structure with installing easily and reduced cost. And it also does not influence the normal running of the inspecting system on a road while not inspecting.

39 Claims, 11 Drawing Sheets

DIRECTION CORRECTING APPARATUS, METHOD THEREOF AND MOVABLE RADIATION INSPECTING SYSTEM

FIELD OF THE INVENTION

The present invention generally relates to a movable radiation inspecting system, a direction correcting apparatus for the movable radiation inspecting system and a direction correcting method thereof. More specifically, the invention relates to a vehicle carrying movable radiation inspecting system in which objects to be inspected, such as container/load carrying vehicle etc, are imaged by rays to inspect the objects by radiation. The invention also relates to a direction correcting apparatus for the vehicle carrying movable radiation inspecting system, in which the direction correcting apparatus automatically corrects a moving direction of a moving device of the movable radiation inspecting system to a predetermined direction when the moving direction departs away from the predetermined direction. The invention also relates to a direction correcting method for correcting a moving direction of the vehicle carrying movable radiation inspecting system.

BACKGROUND OF THE INVENTION

A vehicle carrying movable radiation inspecting system is an essential inspecting device to customs, civil airplane services and rail stations etc. for inspecting objects to be inspected, such as containers/load carrying vehicles. The vehicle carrying movable radiation inspecting system utilizes radiation imaging principle for scanning the containers/load carrying vehicles and obtaining perspective views of cargos in the containers/load carrying vehicles without opening the containers and the load carrying vehicles. And suspicious items or contraband hidden in the cargos can be found by analyzing the images thereof.

A movable container/load carrying vehicle inspecting system generally integrates on a vehicle. Thus, the movable radiation inspecting system is also called a scanning vehicle or vehicle carrying movable radiation inspecting system, and the vehicle is used as a moving device for the inspecting system. During inspection, the container/load carrying vehicle to be inspected stops at a given inspecting area to be scanned by the scanning vehicle. The scanning vehicle reciprocally moves in a predetermined direction parallel to the container/load carrying vehicle during scanning.

However, due to the uneven weight distribution of the scanning vehicle, the unevenness of the floor and inconsistency of gas pressures in the wheels etc., the moving direction of the scanning vehicle may be deviated from the predetermined direction parallel to the container/load carrying vehicle to be inspected after several scanning of the scanning vehicle. If the deviation of the moving direction of the scanning vehicle is not corrected in time, it may occur that the scanning vehicle collides with the container/load carrying vehicle.

To correct the deviation of the moving direction of the scanning vehicle, the conventional movable container/load carrying vehicle inspecting system has to be stopped after several scanning. And the moving direction of the scanning vehicle has to be corrected to the predetermined direction by an operator which greatly impacts the working efficiency of the system.

In addition, to correct the deviation of the moving direction of the scanning vehicle, a special driver is needed in the cab of the scanning vehicle, and the driver corrects the moving direction of the scanning vehicle. However, this leads to increase of manpower. And since there is scattering rays during scanning, the health of the driver may be harmed.

SUMMARY OF THE INVENTION

The present invention is provided to solve above shortcomings and problems in prior art. In an automatic correcting apparatus and method of the vehicle carrying movable radiation inspecting system which is the embodiment of the invention, no manpower is involved to automatically control the movable radiation inspecting system to maintain linear movement in a predetermined direction during working. Accordingly the automatic control degree of the whole system is increased. The invention has a simple structure with installing easily, and the cost thereof is reduced without influencing the movable radiation inspecting system running on road.

Accordingly, according to an aspect of the present invention, a direction correcting apparatus for a vehicle carrying movable radiation inspecting system is provided. The direction correcting apparatus comprises: a direction detecting device for detecting a moving direction of the moving device and generating a detecting signal indicating the moving direction; a direction control device for controlling the moving direction of the moving device; and a control unit for calculating a deviation value between the moving direction and the predetermined direction based on the detected signal received from the direction detecting device, and the direction control device is driven according to the deviation value to correct the moving direction to the predetermined direction.

Preferably, the direction correcting apparatus comprises first and second distance detectors, which generate first and second distance detecting signals respectively, wherein the control unit calculates the deviation value based on the first and second distance detecting signals.

Further, the first and second distance detectors detect first and second distances between the moving device and the object to be inspected.

Preferably, the direction correcting apparatus further comprises a reference member, wherein the first and second detectors detect the first and second distances between the moving device and the reference member.

Preferably, the first and second distance detectors comprise distance measuring laser sensors.

Preferably, the control unit comprises: an analog/digital converter which converts analog signals of the first and second distance detecting signals into digital signals; a processor which calculates the deviation value based on the first and second distance detecting signals being converted into digital signals to generate a driving signal corresponding to the deviation value; a signal driver for receiving and amplifying the driving signal; and a driving circuit for driving the direction control device based on the amplified driving signal received from the signal driver, to correct the moving direction of the moving device.

Further, the control unit comprises a signal isolator connected between an output of the analog/digital converter and an input of the processor to isolate input signals inputted therein and output signals outputted therefrom.

Further, the signal isolator comprises a photoelectric isolator.

Preferably, the processor comprises a MCU.

Preferably, the direction control device comprises: a steering wheel for controlling the moving direction of the moving device; and an actuator detachably engaged with the steering wheel and driven by the control unit, to rotate the steering wheel so that the moving direction of the moving device is controlled.

Further, the direction control device comprises a connecting mechanism, of which an end is connected with the actuator and the other end is detachably engaged with the steering wheel of the moving device.

Specifically, the connecting mechanism comprises: a connecting rod, of which an end is connected to the actuator; a post, the other end of the connecting rod is connected to the post with a joint bearing, and a top end of the post is provided with a nut for positioning the connecting rod; an installing plate, the post is provided at a top face of the installing plate, a side of the installing plate is detachably engaged with the outer periphery of the steering wheel to rotate the steering wheel.

Further, the direction control device comprises a bracket and a cross-shaped block, the cross-shaped block hinges with the bracket to form a gimbal, and the actuator is provided to the bracket by the cross-shaped block.

Specifically, the direction control device further comprises: a supporting plate on which the bracket is provided; a shielding switch provided on the supporting plate; and a pressing plate connected to the gimbal so that the pressing plate bumps against the shielding switch to power off the actuator when the actuator and the connecting mechanism both are detached from the steering wheel.

Preferably, the actuator comprises: a motor driven by the control unit; a worm wheel connected with an output shaft of the motor; and a worm engaged with the worm wheel, and an axial end of the worm is connected with the connecting mechanism.

Preferably, the actuator comprises a hydraulic cylinder driven by the control unit and a cylinder rod thereof is connected with the connecting mechanism.

Further, the actuator comprises a gas cylinder driven by the control unit and a cylinder rod thereof is connected with the connecting mechanism.

Alternatively, the direction control device comprises: a transmitting device driven by the control unit; and a flexible traction member, both ends of the flexible traction member are turned around the steering wheel, connecting to the transmitting device respectively.

Further, the flexible traction member is a traction rope.

Preferably, the traction rope is detachably engaged into a groove at the outer periphery of the steering wheel by a clipping plate and screws.

Preferably, the transmitting device comprises: a motor driven by the control unit; a decelerator having two output shafts driven by the motor, both ends of the traction rope are connected with the two output shafts of the decelerator having two output shafts.

Preferably, the transmitting device further comprises: first and second couplings, input sides of the first and second couplings are connected with two output shafts of the decelerator; first and second reel shafts, which are connected with the output sides of the first and second couplings and supported by first and second supporting bases; and first and second reels respectively provided on the first and second reel shafts, wherein both ends of the traction rope are wound around the first and second reels respectively.

Further, the transmitting device further comprises first and second adjusting devices for adjusting tensioning degree of the traction rope.

Still further, the transmitting device further comprises first and second overrunning clutches provided in the first and second couplings.

Preferably, the overrunning clutches comprise inner teeth ratchet overrunning clutches. Additionally, the reference member comprises an integral flat plate piece provided parallel to the predetermined direction.

Alternatively, the reference member comprises a plurality of flat plate segments, which are spaced apart parallel to the predetermined direction and arranged in alignment.

Preferably, the direction detecting device comprises at least a photoelectric switch, wherein the control unit controls the distance between the moving device and the object to be inspected within a predetermined distance based on the signals received from the at least one photoelectric switch.

Preferably, there are two photoelectric switches.

Preferably, the control unit comprises: a signal collector transmitter for collecting signals from the first and second distance detectors and the photoelectric switch; and a signal receiver for wirelessly receiving the signals transmitted from the signal collector transmitter.

According to a second aspect of the invention, a movable radiation inspecting system is provided, comprising the direction correcting apparatus according to the first aspect of the invention.

According to a third aspect of the invention, a direction correcting method for correcting the moving direction of a movable radiation inspecting system which has a moving device is provided. The direction correcting method comprising steps of: detecting step of detecting a moving direction of the moving device and generating detecting signals indicating the moving direction; calculating step of calculating a deviation value between the moving direction and a predetermined direction based on the detected signals, and automatically correcting the moving direction to the predetermined direction based on the deviation value.

According to the automatic direction correcting apparatus and method thereof and the movable radiation inspecting system, when the moving direction of the moving system deviates from the predetermined direction, the control unit calculates the deviation value between the moving direction and the predetermined direction based on the detected detecting signals, and the direction control device is driven based on the calculated deviation value, so that the moving direction of the moving device is corrected to the predetermined direction in order to make the moving device linearly move in the predetermined direction.

Therefore, when direction deviation is being corrected, the inspecting system need not to be stopped, without manpower involvement, the control unit automatically completes the direction correction, increasing work efficiency and safety performance. In addition, the structure is simple with easy assembly/disassembly and reduced cost.

Additionally, according to a preferred embodiment of the invention, the distance between the moving device and the object to be inspected such as a container vehicle is controlled to a predetermined distance with the two photoelectric switches, so that the relative displacement of the moving device to the object to be inspected is avoided, otherwise the object to be inspected may be damaged by bumping.

BRIEF DESCRIPTION OF THE DRAWINGS

These and/or other aspects and advantages of the present invention will be more readily apparent from the following detailed description of preferred embodiments when taken together with the accompanying drawings.

DETAILED DESCRIPTION OF THE PREFERRED EMBODIMENTS

Figure 1:
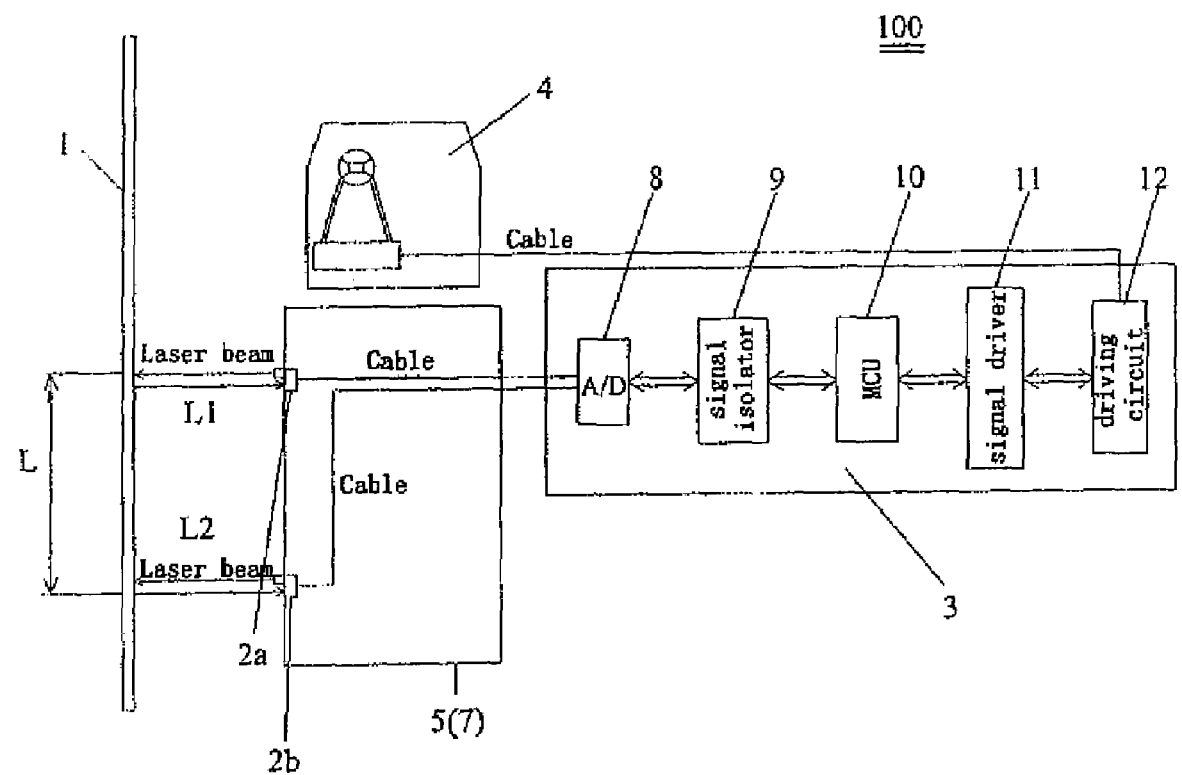
FIG. 1 is a schematic diagram of a direction correcting apparatus for a movable radiation inspecting system according to a first embodiment of the present invention.

Reference will now be made in detail to the embodiment of the present invention, examples of which are illustrated in the accompanying drawings, wherein like reference numerals refer to the like elements throughout. The embodiments are described below to explain the present invention by referring to the figures.

FIG. 1 is a schematic diagram of a direction correcting apparatus 100 for a movable radiation inspecting system 7 according to the present invention. And FIG. 2 is a top view of the direction correcting apparatus 100 of the present invention under working conditions.

In an embodiment of the present invention, the movable radiation inspecting system 7 comprises a moving device 5 for moving the whole inspecting system 7. In other words, components of the inspecting system 7, such as a radiation source, a detector and an imaging control system etc., are arranged on the moving device 5, the moving device 5 may, for example, uses a vehicle, such as a motor vehicle having a chassis frame. Thus, the movable inspecting system 7 is generally termed as a scanning vehicle or a vehicle carrying movable radiation inspecting system.

However, it should be noted that the moving device 5 of the movable radiation inspecting system 7 is not limited to the vehicle having a chassis frame, and it can be any suitable moving vehicle in the art, such as a traction vehicle driven by a motor vehicle or other traction device.

Figure 2:
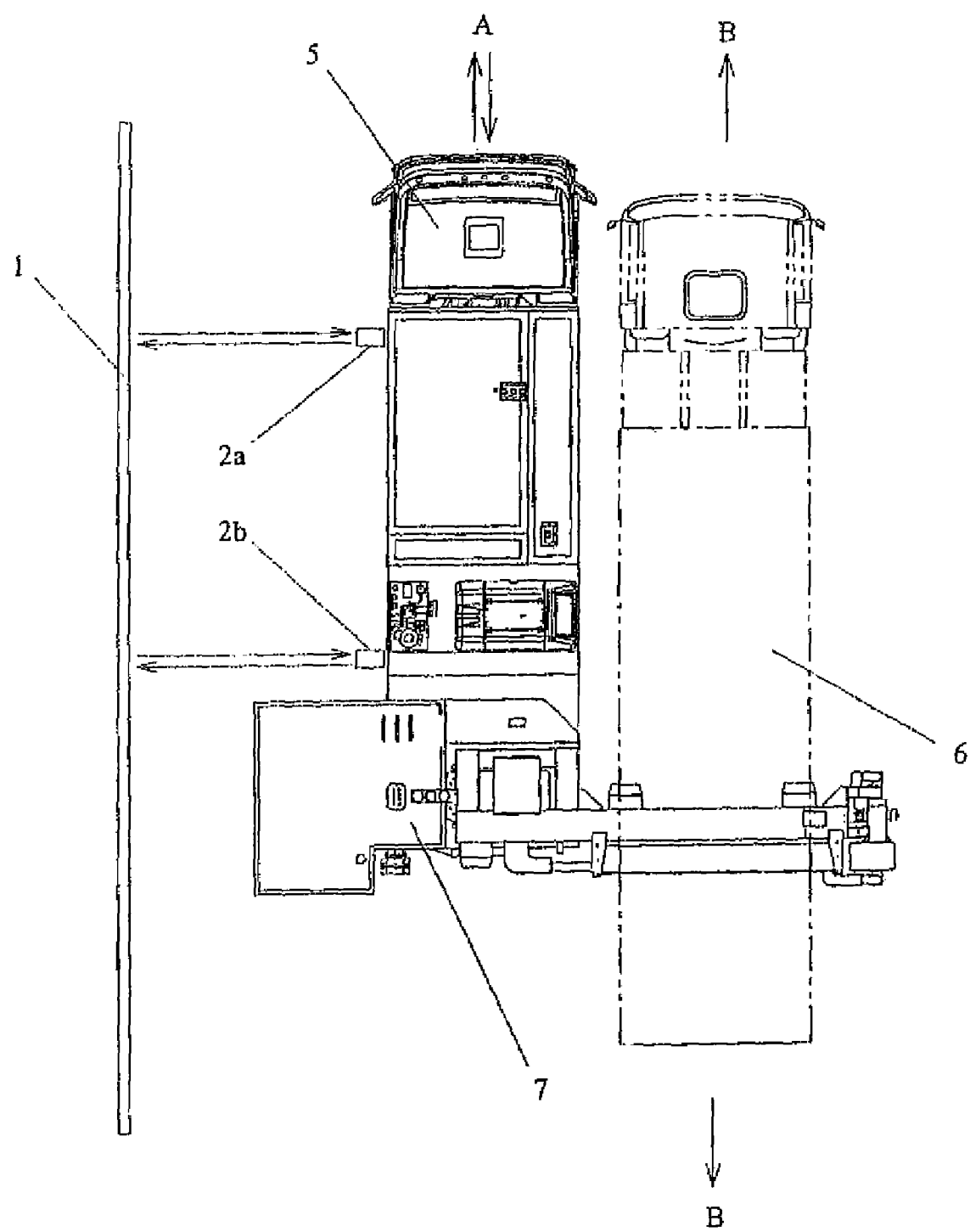
FIG. 2 is a top view of the direction correcting apparatus of the present invention under work conditions, in which the first embodiment of a reference member is shown.

As shown in FIGS. 1-2, the correcting apparatus 100 for the movable radiation inspecting system according to the embodiment of the present invention comprises a reference member 1, a first distance measuring device 2a and a second distance measuring device 2b as the direction measuring device, a direction control device 4 and a control unit 3.

The first and second distance measuring devices 2a, 2b are provided on the moving device 5 of the scanning vehicle with a predetermined distance L spaced apart in the moving direction A of the scanning vehicle for detecting a first distance L1 and a second distance L2 between the reference member 1 and the moving device 5 to generate first and second distance measuring signals. The first and second distance measuring devices 2a, 2b includes, rather than limited thereto, a laser distance measuring sensor which emits laser toward the reference member 1 so that the first and second distance L1, L2 between the moving device 5 and the reference member 1 are measured.

In the embodiment shown in FIGS. 1 and 2, the first and second distance measuring devices 2a, 2b is the preferable embodiment of the direction detecting device. However, the direction detecting device is not limited to the first and second distance measuring devices 2a, 2b, and it may be any device that can detect the moving direction of the moving device 5 and generate detecting signals indicating the moving direction of the moving device 5 and transmit the detected signals to the control unit 3. For example, only one distance detector can be provided which can also achieve the correction of the deviation of the moving direction of the moving device.

The direction control device 4 can control the moving direction of the moving device 5. The control unit 3 receives the first and second distance measuring signals from the first and second distance measuring devices 2a, 2b, and calculates a deviation value between the moving direction A and the predetermined direction B based on the first and second distance measuring signals so that the moving direction A can be corrected to the predetermined direction B, the predetermined direction is, for example, one that parallels to the longitudinal central axis of a vehicle 6 to be inspected as an object to be inspected.

In the embodiment shown in FIG. 2, the reference member 1 is an integral flat plate which is provided in parallel to the left side of the vehicle 6 to be inspected. During the inspection of the vehicle 6 to be inspected, the scanning vehicle 7 passes between the reference member 1 and the vehicle 6 to be inspected, so that the laser emitted from the first and second distance measuring devices 2a, 2b can measure the first and second distances L1, L2 in real time, and the generated first and second distance measuring signals are transmitted to the control unit 3.

In the embodiment shown in FIGS. 1 and 2, the first and second distance measuring devices 2a, 2b transmit the first and second distance measuring signals to the control unit 3 by a cable. Alternatively, the first and second distance measuring signals can also be transmitted to the control unit 3 wirelessly (to be described in detail hereafter).

Alternatively, the reference member 1 in flat plate shape can also be provided at the right side of the vehicle to be inspected. During the inspection of the vehicle 6 to be inspected, the scanning vehicle 7 moves at the left side of the vehicle 6 to be inspected. At this time, the height of the reference member 1 should ensure that the laser emitted from the first and second distance measuring devices 2a, 2b can reach the reference member 1 without being blocked by the vehicle 6 to be inspected. Alternatively, the reference member 1 can also be directly provided onto the vehicle 6 to be inspected.

Alternatively, the reference member 1 is not necessary for the correcting apparatus 100. For example, the moving direction of the moving device 5 can be detected by detecting a distance between the moving device 5 and the vehicle 6 to be inspected. That is to say, the vehicle 6 to be inspected can be used to replace the reference member 1 provided separately. It is appreciated that the reference member 1 can also be provided onto the vehicle 6 to be inspected.

It should be noted that the length of the reference member 1 is normally larger than a moving area of the scanning area of the scanning vehicle 7, so that the laser emitted from the first and second distance measuring devices 2a, 2b can be ensured to be blocked by the reference member 1 during the whole inspection.

Figure 3:
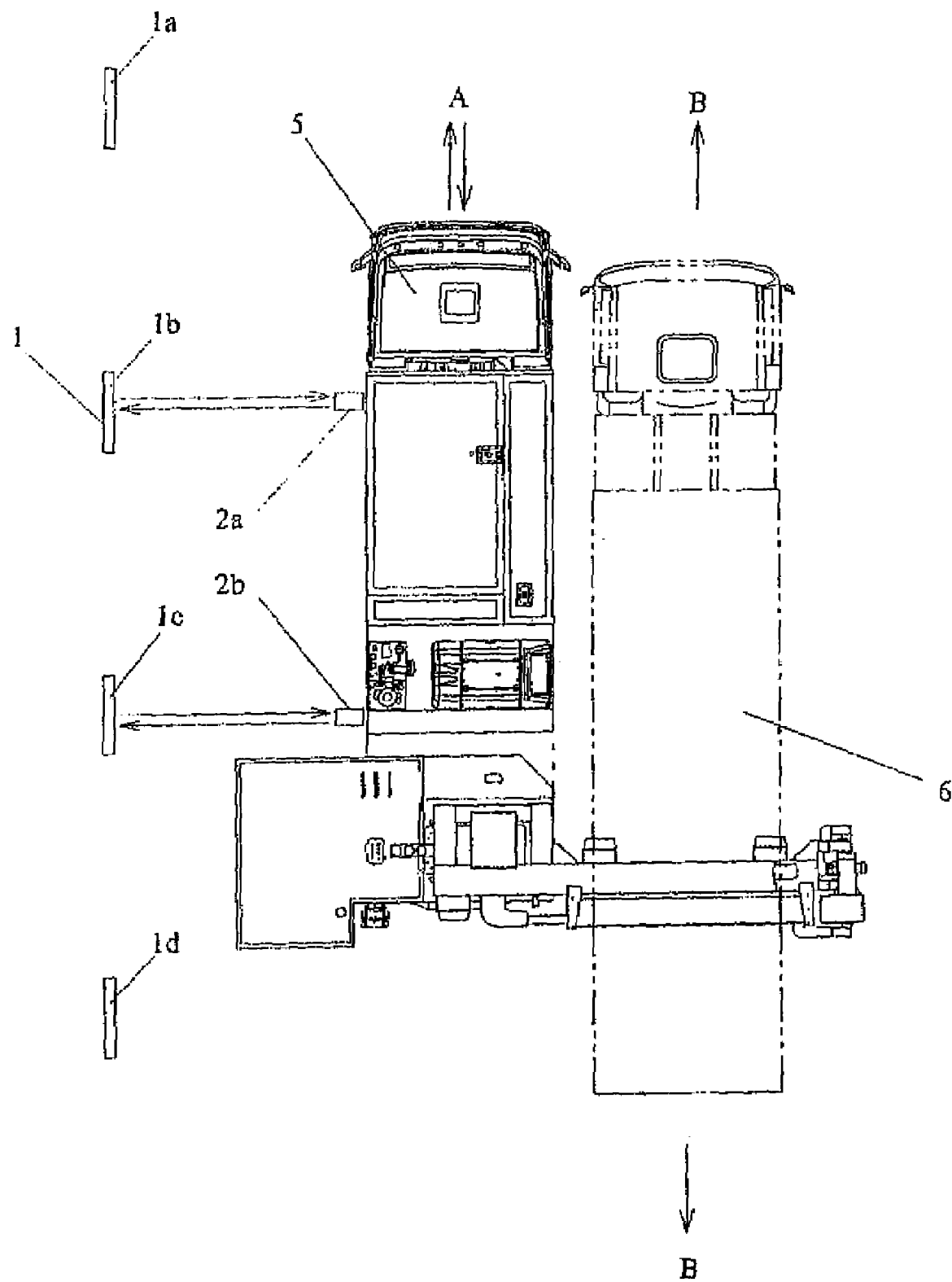
FIG. 3 is a top view of the direction correcting apparatus of the present invention under working conditions, in which a second embodiment of a reference member is shown.

As shown in FIG. 3, another embodiment of the reference member 1 is shown. In the embodiment shown in FIG. 3, reference member 1 is a plurality of flat plate segments, such as 4 flat plate segments 1a-1d shown in FIG. 3, however, the present invention is not limited thereto. There may have any appropriate number of flat plate segments. The four flat plate segments 1a-1d are arranged in parallel to the predetermined direction B in a separate way and aligned with each other As shown in FIG. 1, preferably, the control unit 3 comprises a A/D converter (analog/digital converter) 8 connected with the first and second distance measuring devices 2a, 2b by a cable, a processor 9, a signal driver 11 and a driving circuit 12. More preferably, the control unit 3 further comprises a signal isolator 9.

The A/D converter 8 can convert analog signals of the first and second distance measuring signals from the first and second distance measuring devices 2a, 2b into digital signals, and the first and second distance measuring signals in digital signal format are transmitted to the signal isolator 9.

Figure 13:
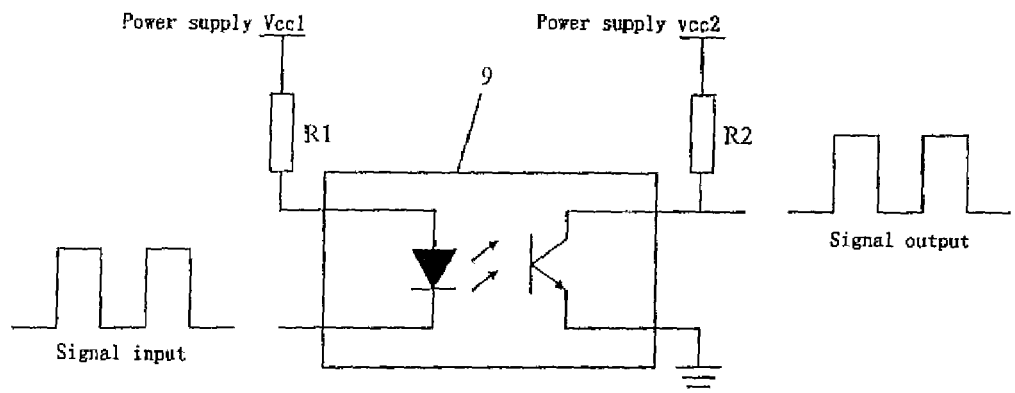
FIG. 13 is a schematic diagram of a signal isolator according to an embodiment of the present invention.

As shown in FIG. 13, an embodiment of the signal isolator 9 is shown accordingly. In the embodiment shown in FIG. 13, the signal isolator 9 is a photoelectric isolator, which transmits electrical signals by light medium. The photoelectric isolator 9 isolates excellently the input signals inputted therein and the output electrical signals outputted therefrom. The photoelectric isolator 9 normally has three portions of light emission portion, light reception portion and signal magnification portion. And a first power supply VCC1 and a second power supply VCC2 are provided at the light input side and light output side. The first power supply VCC1 and second power supply VCC2 are connected with the photoelectric isolator 9 by first and second resistors R1 and R2, respectively. The input signals drive a LED to emit light with a certain wavelength. The light is received by a light detector to generate photocurrent which is outputted after further magnification, thus completing the "electrical-photo-electrical" conversion, which functions for isolation of the input and output. Since the mutual isolation between the input and output of the photoelectric isolator 9, the electrical signal transmission has, for example, unidirectional etc., characteristics, thus, having excellent electric insulativity and anti-interference capability.

In the present invention, the photoelectric isolator 9 can be any signal isolator available on market, rather than limited to the photoelectric isolator mentioned above.

The photoelectric isolator 9 receives digital distance detecting signals from the A/D converter 8 and sends back the signal after "electrical-photo-electric" conversion to the processor 10.

According to the present invention, the processor 10 may be a Microprocessor Control Unit (MCU), a chip, a programmable logic controller (PLC), a computer, or any other proper processing device. The processor 10 receives the first and second distance measuring signals from the photoelectric isolator 9, and calculates the deviation value between the moving direction A of the moving device 5 (i.e. the scanning vehicle 7) and the predetermined direction B based on the first and second distance measuring signals, thus generating driving signals corresponding to the deviation value.

For example, if the deviation value is zero, the processor 10 determines that the moving direction A is consistent with, i.e., parallel to, the predetermined direction B. If the deviation value is not zero, the processor 10 determines that there is a deviation between the moving direction A and the predetermined direction B, i.e., there is an angle between the moving direction A and the predetermined direction B.

For example, if the deviation value is positive, the processor 10 determines that the moving direction A deviates toward left with respect to the predetermined direction B in FIGS. 2, 3. If the deviation value is negative, the processor 10 determines that the moving direction A deviates toward right with respect to the predetermined direction B in FIGS. 2, 3.

It should be noted that the above determining method of the processor is only an example, the present invention is not limited thereto. For example, when the first and second distance measuring devices 2a, 2b are provided on the moving device 5, even the longitudinal central axis of the moving device 5 parallels to the reference member 1, the initial distance between the first and second distance measuring devices 2a, 2b and the reference member 1 may have error due to the installation error. However, the error thereof can be processed as the reference zero value by zero adjustment. It is appreciated for those skilled in the art that the processor 10 can calculate the deviation value based on the first and second distance detecting signals by adopting any suitable method in the art, thus determine whether the moving direction A is deviated from the predetermined direction B or not, and generates driving signals corresponding to the deviation value, thus driving the direction control device with the driving signals. For example, the processor 10 can determine whether the moving direction A is deviated from the predetermined direction B based on the comparison of the first and second distances L1 and L2.

The signal driver 11 can receive driving signals from the processor 10 and amplifies the driving signals.

Figure 14:
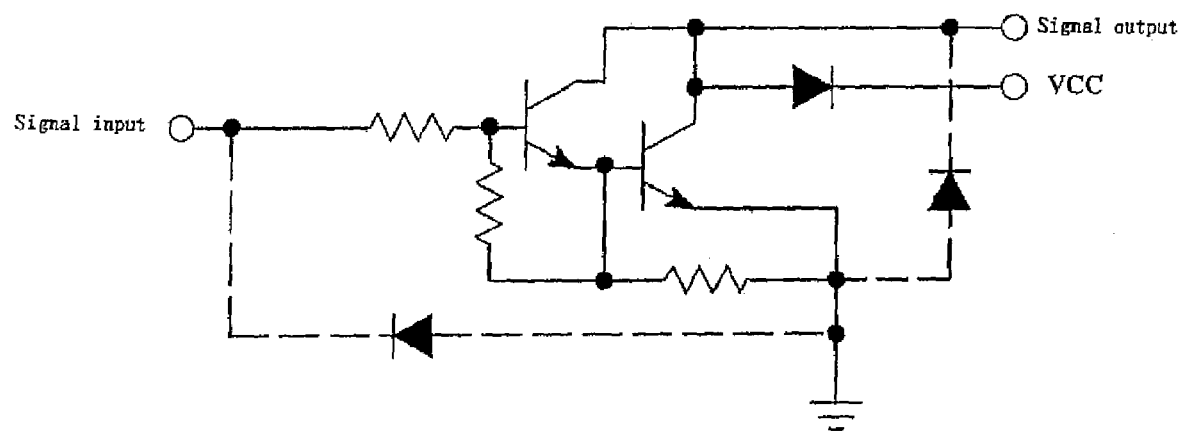
FIG. 14 is a circuit schematic diagram of a signal driver according to the embodiment of the present invention.

A schematic circuit diagram of the signal driver is shown in FIG. 14. In the case of the processor 10 being a MCU, driving current outputted from the MCU 10 as the driving signals is normally small, such as less than 50 mA. To drive larger load, the signal driver 11 is used for increasing the driving current outputted from the MCU 10. For example, as shown in FIG. 14, after the input signal passes through the signal driver 11 configured by Darlington transistor arrays, the driving current can be amplified to 500 mA.

The amplified driving current is sent to the driving circuit 12 by the signal driver 11 to drive the direction control device 4.

Figure 4:
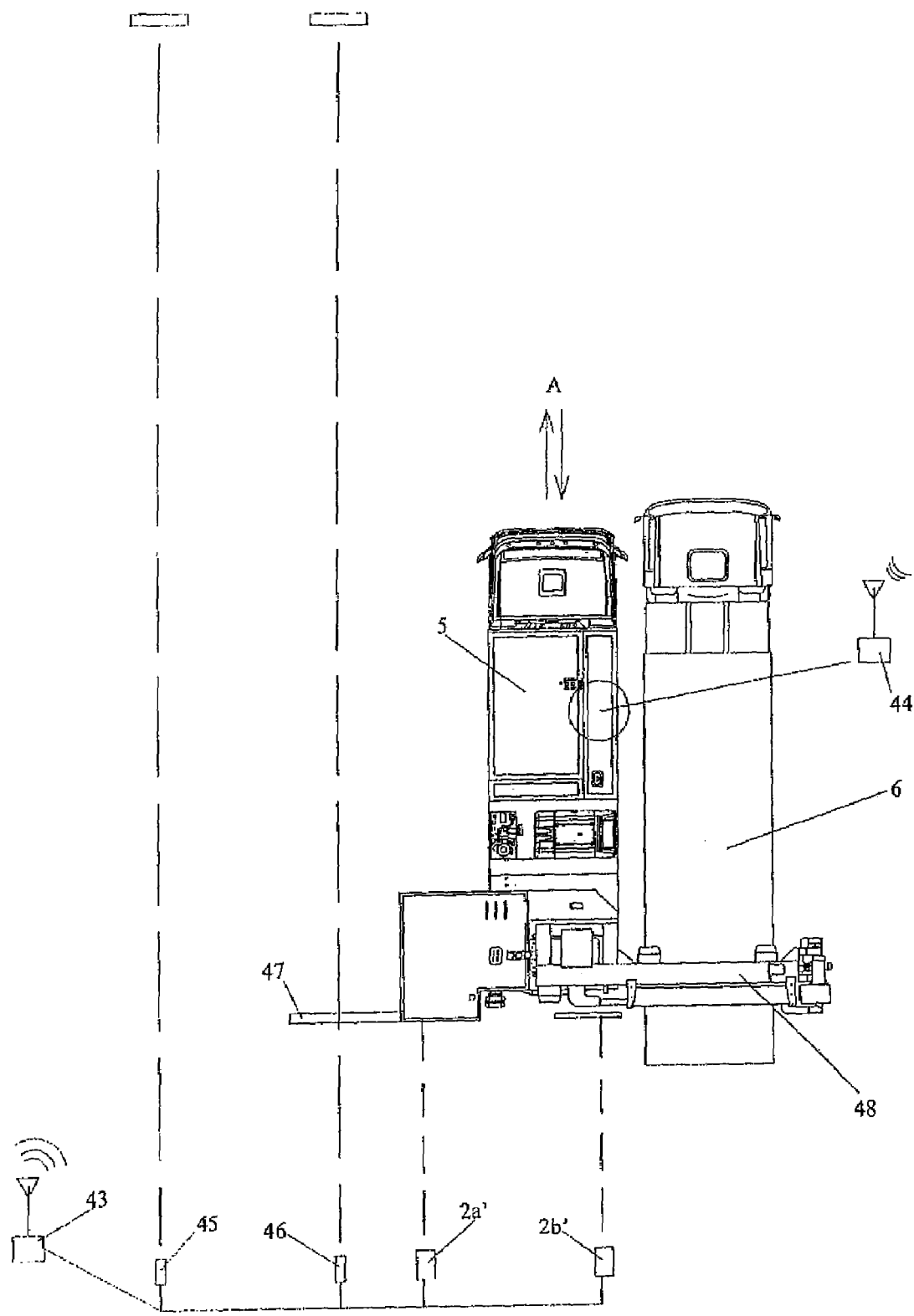
FIG. 4 is a schematic plan of a direction correcting apparatus according to the second embodiment of the present invention.

The direction correcting apparatus according to the second embodiment of the present invention will be described with reference to FIG. 4. As shown in FIG. 4, the direction correcting apparatus for a movable radiation inspecting system according to the second embodiment of the present invention comprises a first distance detector 2a' and a second distance detector 2b', a first photoelectric switch 45 and a second photoelectric switch 46, a direction control device 4 (cf. FIG. 1), a control unit 3 (FIG. 1) and a reference member (not shown) provided at front or rear of the moving device 5. The first distance detector 2a', the second distance detector 2b', the first photoelectric switch 45 and the second photoelectric switch 46 form the direction detecting device. The control unit 3 comprises a signal collector transmitter 43 and a signal receiver 44, the remaining configuration of the control unit 3 is the same with those in the first embodiment, the description thereof is hereby omitted for clarity purpose.

The signal collector transmitter 43 collects signals of the first distance detector 2a', the second distance detector 2b', the first photoelectric switch 45 and the second photoelectric switch 46, and sends the signals thereof to the signal receiver 44 wirelessly Then, the signal receiver 44 sends the signals received to the processor 10 by, for example, a A/D converter 8 to determine whether the moving direction A of the moving device 5 deviates from the predetermined direction or not and calculate the deviation value thereof (it should be noted that even if there is no deviation, the processor 10 can also calculate the deviation with the deviation value being zero).

The first photoelectric switch 45 and the second photoelectric switch 46 send, for example, on/off signals to the control unit 3 so that the control unit 3 can control the distance between the moving device 5 and the vehicle 6 to be inspected to the predetermined distance based on the signals received from the first photoelectric switch 45 and the second photoelectric switch 46 to prevent the moving device 5 displacing leftwards or rightwards in FIG. 4 with respect to the vehicle 6 to be inspected. In other words, the control unit 3 determines whether the moving device 5 displaces with respect to the vehicle 6 to be inspected based on the signals received from the first photoelectric switch 45 and the second photoelectric switch 46, to prevent a door shaped frame 48 of the inspecting system for imaging vehicles to be inspected from colliding with the vehicle to be inspected.

As shown in FIG. 4, the moving device 5 can be provided with a shielding member 47. When there is no displacement of the moving device 5 with respect to the vehicle 6 to be inspected, i.e., there is a predetermined distance between the moving device 5 and the vehicle 6 to be inspected, the first photoelectric switch 45 is switched on and the second photoelectric switch 46 is shielded by the shielding member 47 (i.e., the second photoelectric switch 46 is switched off).

The operation of the direction correcting apparatus according to the second embodiment of the present invention will be described hereafter.

For example, when the moving device 5 is about to move for inspecting the vehicle 6 to be inspected, if the distance between the moving device 5 and the vehicle 6 to be inspected is larger than the predetermined distance, the first photoelectric switch 45 and the second photoelectric switch 46 both are switched off, thus it is determined by the control unit 3 that the moving device 5 is displaced leftwards in FIG. 4 with respect to the vehicle 6 to be inspected. Then, the control unit 3 generates corresponding driving signals for driving the direction control device 4, thus adjusting the moving direction of the moving device 5 and, further, adjusting the distance between the moving device 5 and the vehicle 6 to be inspected. When the control unit 3 receives the signals for indicating the first photoelectric switch 45 being switched on and the second photoelectric switch 46 being switched off again, the direction control device 4 is driven to be reset (i.e., the moving device 5 moves linearly in a direction in parallel to the predetermined direction).

When the control unit 3 receives the signals for indicating the first photoelectric switch 45 and the second photoelectric switch 46 being switched on, it is determined that the distance between the moving device 5 and the vehicle 6 to be inspected is less than the predetermined distance. At this time, the operation of the control unit 3 of adjusting the moving direction of the moving device 5 by the direction control device 4 is the reversal of the above operations, which is hereby omitted.

Thus, according to the second embodiment of the present invention, by the first distance detector 2a', the second distance detector 2b', the first photoelectric switch 45 and the second photoelectric switch 46, not only the moving direction of the moving device 5 can be monitored in real time, but also the distance between the moving device 5 and the vehicle 6 to be inspected can be controlled.

It should be noted that the first distance detector 2a' and the second distance detector 2b' can be omitted with only the first photoelectric switch 45 and the second photoelectric switch 46 remained in the direction correcting apparatus according to the second embodiment of the present invention. In this case, the control unit 3 can determine whether the distance between the moving device 5 and the vehicle 6 to be inspected is the predetermined distance or not based on the on/off condition of the first photoelectric switch 45 and the second photoelectric switch 46. When the distance deviates from the predetermined distance, the control unit 3 drives the direction control device 4 to change the moving direction of the moving device 5 so that the distance is adjusted to the predetermined distance.

Additionally, in the direction correcting apparatus according to the second embodiment of the present invention, the first photoelectric switch 45 and the second photoelectric switch 46 are arranged at a side of the moving device 5 side by side. However, it is appreciated for those skilled in the art that the arrangement of the first photoelectric switch 45 and the second photoelectric switch 46 is not limited thereto, and they may be arranged at any proper position. In addition, the number of the photoelectric switches is not limited to two, it may be any proper amount.

Figure 5:
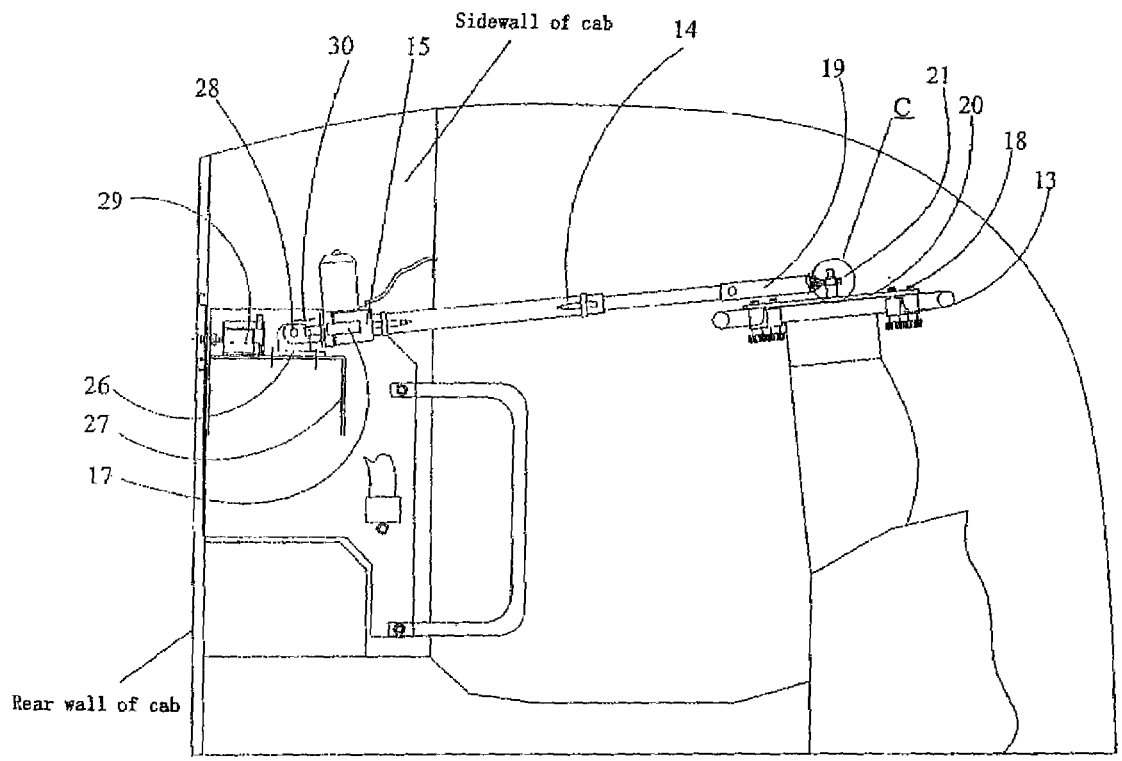
FIG. 5 is a schematic plan of the direction control device according to the first embodiment of the present invention, in which the direction correcting apparatus is under working conditions.
Figure 6:
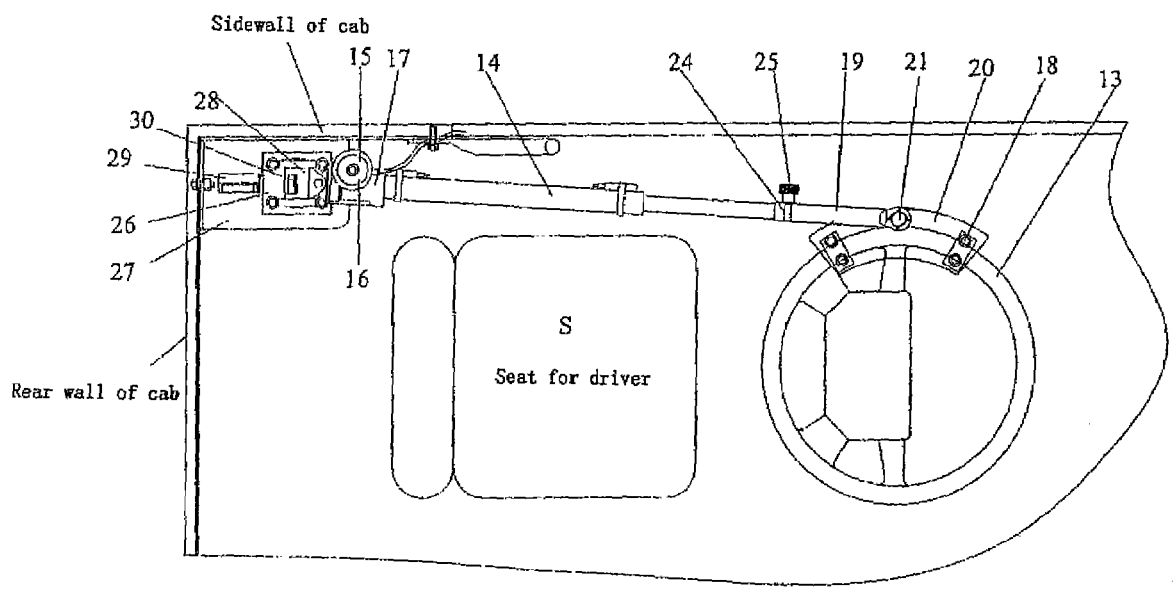
FIG. 6 is a top schematic plan of the direction control device shown in FIG. 5.

The first preferable embodiment of the direction control device 4 will be described with reference to FIGS. 5-8. As shown in FIGS. 5, 6, the direction control device 4 comprises a steering wheel 13 and an actuator 14 for controlling the moving direction A of the moving device 4, such as, the steering wheel 13 can be the steering wheel of the scanning vehicle, the actuator 14 is provided at rear of the driver seat S, such as at the sidewall of the cab, which will be described in detail in the following, and extended to the steering wheel 13 from the side of the seat S to be connected with the steering wheel 13.

The actuator 11 detachably is connected with the steering wheel 13, and driven by the driving circuit 12 of the control unit 3 to rotate the steering wheel 13 so as to control the moving direction A of the moving device 5.

Further, the direction control device 4 further comprises a connecting mechanism 18 with one end connected with the actuator 14 and the other end detachably connected with the steering wheel 13.

More specifically, the connecting mechanism 18 comprises a connecting rod 19, an installing plate 20, a joint bearing 21 and a post 22.

Figure 7:
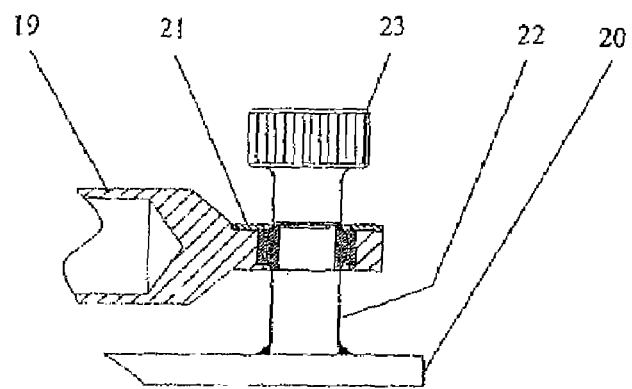
FIG. 7 is an enlarged schematic plan of a portion indicated with C in FIG. 5.

The installing plate 20 is detachably fixed to the outer periphery of the steering wheel 13 by screws. As shown in FIG. 7, the post 22 is provided on the upper surface of the installing plate 20, an end of the connecting rod 19 is connected with the post 22 by the joint bearing 21 to be rotatable with respect to the post 22. The post 22 is provided with a nut 23 on the top end for positioning the connecting rod 19. The other end of the connecting rod 19 is hinged with the actuator 14 by a pin shaft 24 and screwed tight by a nut 25.

Preferably, the direction correcting apparatus 100 according to the embodiment of the present invention further comprises an installing plate 27, which is provided, for example, at a sidewall at the rear part of the cab of the scanning vehicle. A bracket 26 is provided on the supporting plate 27, the actuator 14 (for example, the actuator 14 is a worm/worm shaft transmitting mechanism driven by a motor, a hydraulic cylinder, or a gas cylinder, which will be described in detail in the following) is provided on the bracket 26 by a cross shaped block 28. The cross-shaped block 28 and the bracket 26 are hinged to form a gimbal, so that the actuator 14 can rotate with respect to the bracket 26.

Figure 8:
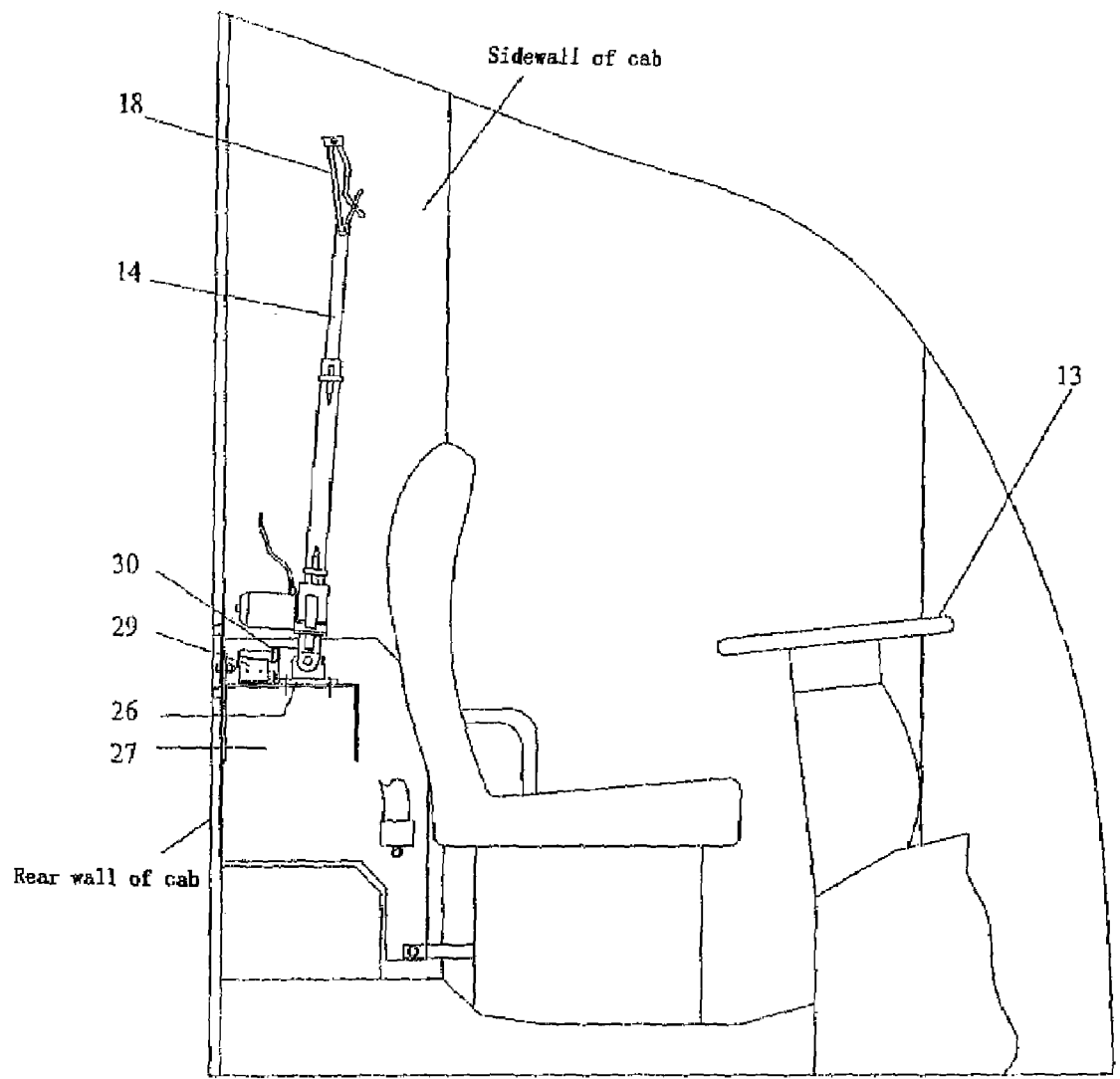
FIG. 8 is a structural schematic plan of the direction control device in FIG. 5 under non-working conditions, in which an actuator of the direction control device detaches from a steering wheel.

More preferably, a shielding switch 29 is provided on the supporting plate 27, and a pressing plate 30 is provided at the rear end (left side in FIGS. 5 and 6) of the gimbal formed by the cross-shaped block 28 and the bracket 26. When the actuator 14 is detached from the steering wheel 13 and erected, the pressing plate 30 bumps against the shielding switch 29, so that the actuator is switched off to stop operation, as shown in FIG. 8. In contrary, when the actuator 14 falls to be engaged with the steering wheel 13, the pressing plate 30 bumps against the shielding switch 29 to switch on the actuator to supply power so that the actuator 14 can be operated, as shown in FIGS. 5, 6.

Preferably, the actuator 14 comprises a motor 15 driven by the driving circuit 12, a worm wheel 16 connected with an output shaft of the motor 15, and a worm 17 engaged with the worm wheel 16. The worm 17 can be rotatably and detachably engaged with the steering wheel 13, and it can be also connected by the connecting mechanism 18 mentioned above. More specifically, the worm 17 rotatably is connected with an end of the connecting rod 19 of the connecting mechanism 18. However, to reduce cost, the worm 17 can be manufactured shorter, and a telescopic bushing (not shown) is provided between the worm 17 and the connecting rod 19. When the worm 17 rotates, the telescopic bushing extends or retracts, to displace the connecting rod 19, thus rotating the steering wheel 13.

The driving circuit 12 drives the motor 15 according to the driving signals of the processor 10, so that the worm wheel 16 rotates, and the worm 17 is rotated and displaced accordingly. The worm drives the connecting rod 19 to displace, so that the steering wheel 13 is rotated, thus correcting the moving direction A of the moving device 5.

It is appreciated for those skilled in the art that the actuator 14 of the present invention is not limited to the motor, worm/worm wheel mechanism described above. Alternatively, the actuator 14 can be a hydraulic cylinder, which is driven by a control unit and the lever thereof is connected to a connecting mechanism such as a connecting rod 19, thus, the steering wheel 13 is driven to rotate based on the deviation value between the moving direction A and the predetermined direction B. Further, the hydraulic cylinder can also be substituted by a gas cylinder.

The operation of the actuator in the manner of a hydraulic cylinder or a gas cylinder is similar to those of the actuator in the first embodiment of the present invention. For clarity purpose, the detailed description thereof is hereby omitted.

Figure 9:
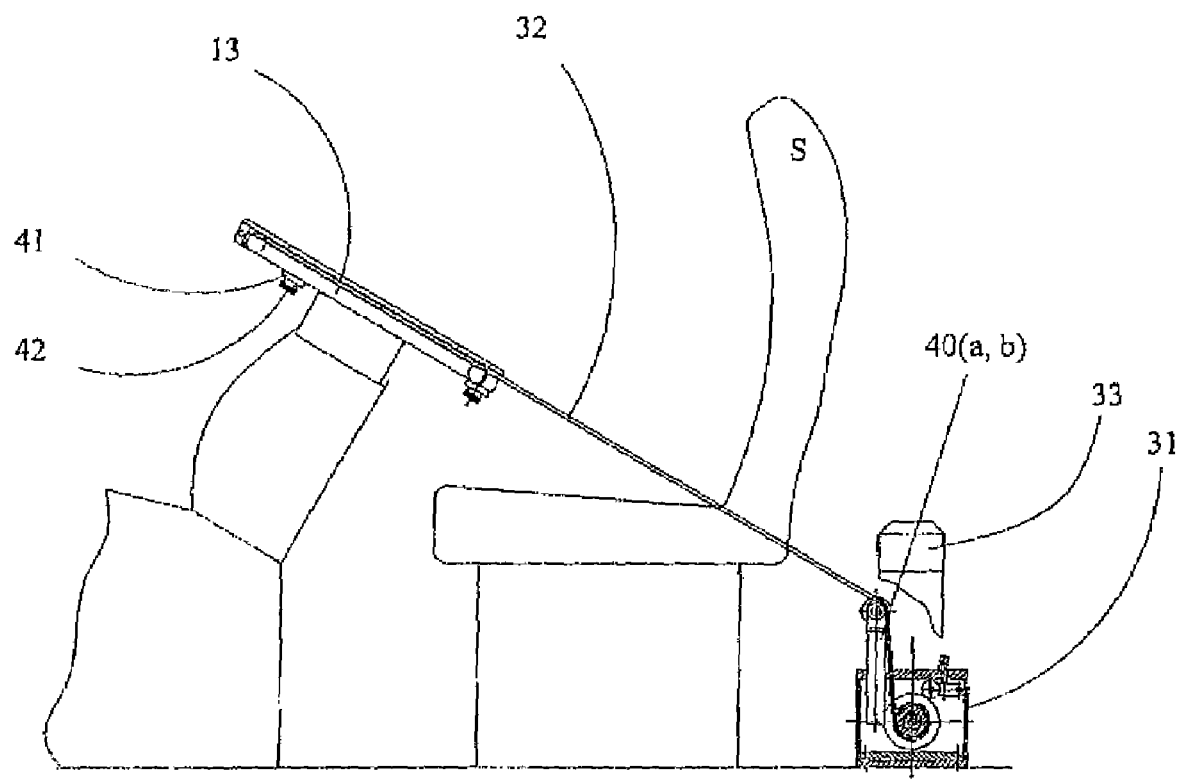
FIG. 9 is a structural schematic plan of the direction control device according to the second embodiment of the present invention.
Figure 10:
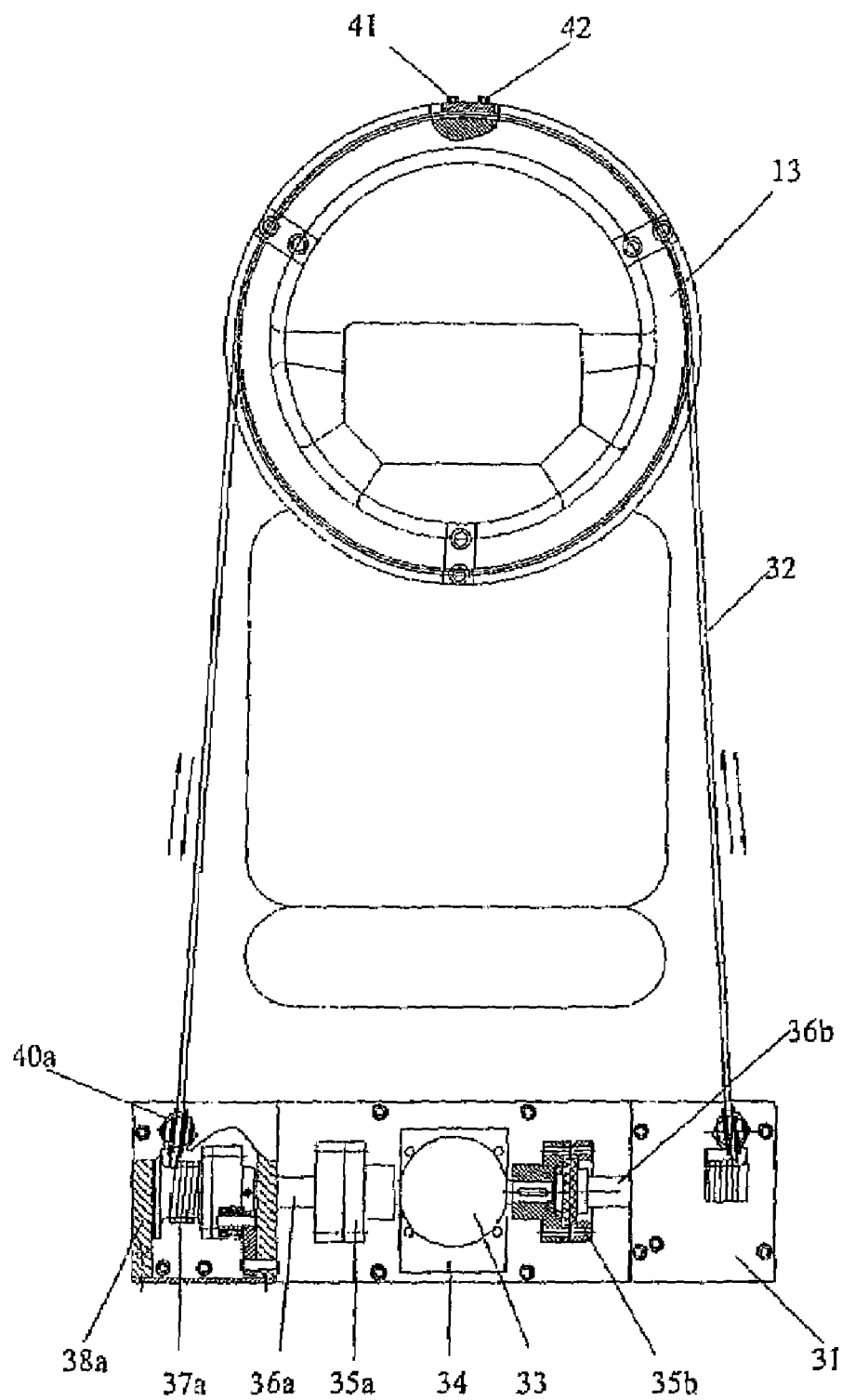
FIG. 10 is a top schematic plan of the direction control device in FIG. 9 clockwise rotating 90 degrees.
Figure 11:
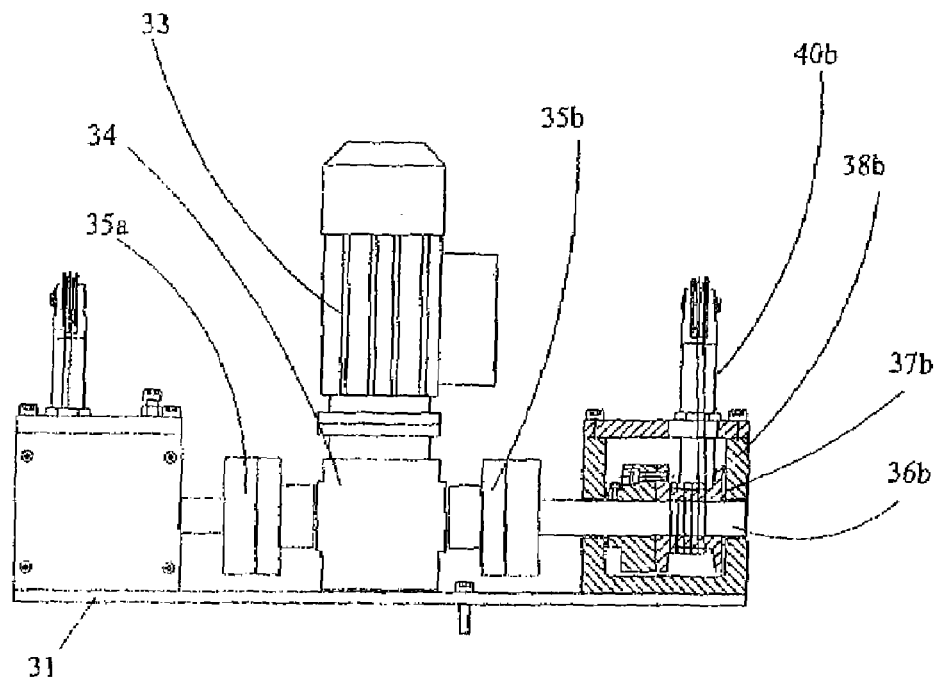
FIG. 11 is a structural schematic plan of a transmitting device of the direction control device in FIG. 9.
Figure 12:
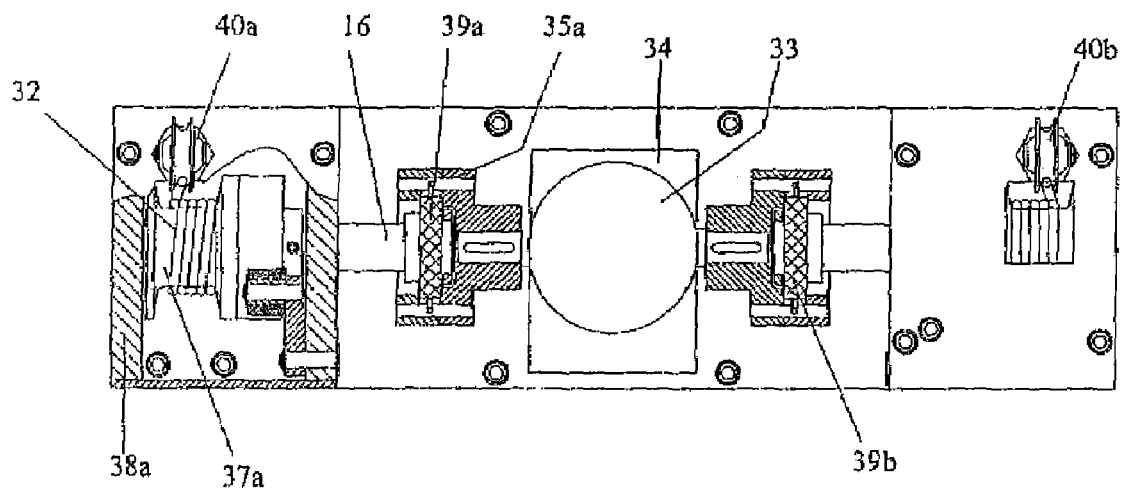
FIG. 12 is a top schematic plan of the transmitting device in FIG. 11.

The second embodiment of the direction control device 4 will be described with reference to FIGS. 9-12. As shown in FIGS. 9, 10, FIG. 9 is a structural schematic plan of the direction control device 4 according to the second embodiment of present invention. And the FIG. 10 is the top view of FIG. 9. The direction control device 4 according to the second embodiment of the present invention comprises a steering wheel 13, a transmitting device 31 and a flexible traction member 32. The transmitting device 31 is driven by the control unit 3 (driving circuit 12), and the flexible traction member 32 turns around the steering wheel 13, and then both ends thereof twist to the transmitting device 31. Preferably, the flexible traction member 32 is a traction rope.

More specifically, the transmitting device 31 comprises a motor 33 driven by the driving circuit 12 of the control unit 3, a decelerator 34 having two output shafts driven by the motor 33, first and second couplings 35a, 35b connected to the two output shafts of the decelerator 34 having two output shafts, first and second reel shafts 36a, 36b connected to the output side of the first and second couplings 35a, 35b, and first and second reels 37a, 37b provided on the first and second reel shafts 36a, 36b respectively.

It should be noted that, if the two output shafts (i.e., the first and second reels 37a, 37b) in the decelerator 34 having two output shafts rotate in the same direction, the two ends of the traction rope 32 wind onto the first and second reels 37a, 37b in opposite direction. Conversely, if the two output shafts (i.e., the first and second reels 37a, 37b) in the decelerator 34 having two output shafts rotate in the opposite direction, both ends of the traction rope 32 wind onto the first and second reels 37a, 37b in the same direction.

More preferably, the transmitting device 31 further comprises first and second support seats 38a, 38b, for supporting the first and second reel shafts 36a, 36b respectively, and the first and second reels 37a, 37b are provided in the first and second support seats 38a, 38b. First and second overrunning clutches 39a, 39b are provided in the first and second couplings 35a, 35b, preferably being inner teeth ratchet overrunning clutches.

Still further, first and second adjusting devices 40a, 40b are provided on the first and second support seats 38a, 38b, respectively, to adjust the tension of the traction rope 32. Preferably, the first and second adjusting devices 40a, 40b are adjusting levers, both ends of the flexible rope 32 pass through the first and second adjusting devices 40a, 40b respectively, then wind to the first and second reels 37a, 37b in opposite direction.

Preferably, a U shaped groove is provided at outer periphery of the steering wheel 13, with the traction rope 32 engaged in the U shaped groove. The rope 32 is fixed by a clipping plate 41 and screws 42 to prevent the traction rope 32 detaching from the U shaped groove and sliding in the U shaped groove. In non-working conditions, such as, when a movable scanning system is required to move from one working location to another working location, the traction rope 32 is detached from the U shaped groove and operated by a driver. The transmitting device 31 is preferably provided at the rear of the seat S in the cab (the left side in FIG. 9). Therefore, the driving will not be influenced after the traction rope 32 is separated from the steering wheel 13.

When the moving direction A of the moving device 5 deviates from the predetermined direction B, the driving circuit 12 of the control unit 3 sends driving signals toward the motor 33 of the driving device 31, the decelerator 34 having two output shafts is rotated by the motor 33, so that the first and second reels 37a, 37b are rotated with an amount corresponding to the deviation value, and thus the traction rope 32 rotates the steering wheel 13, and corrects the moving direction A of the moving device 5 to the predetermined direction B.

A direction correcting method for correcting direction deviation of a movable radiation inspecting system during radiation inspecting by scanning by the direction correcting apparatus according to the present invention will be described with reference to FIG. 15, the direction control device is the second embodiment of the direction control device shown in FIGS. 9-12. However, those skilled in the art will appreciate that the description of the direction correcting apparatus also applies to the first embodiment of the direction control apparatus.

Figure 15:
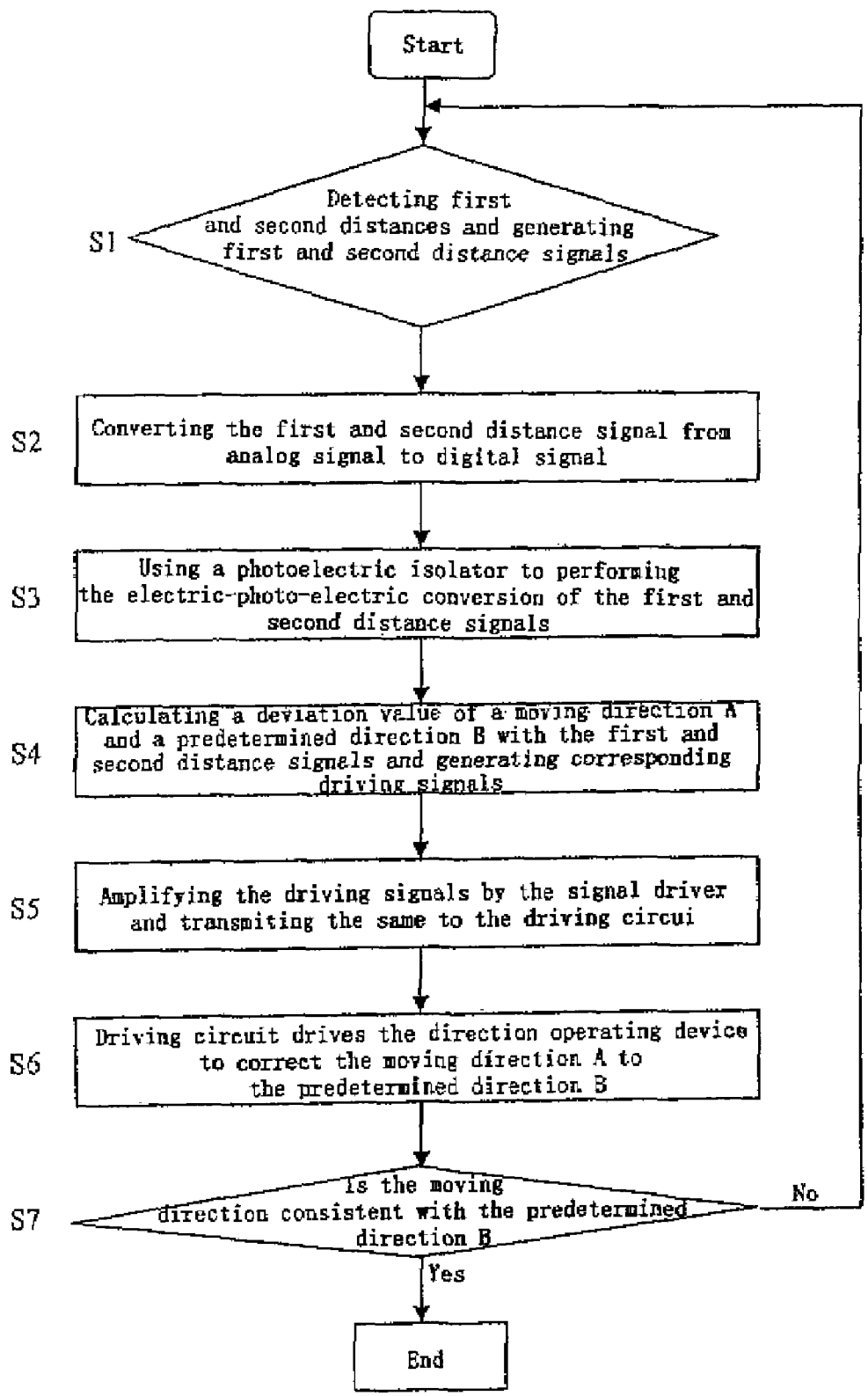
FIG. 15 is a flow chart of the direction correcting method according to the embodiment of the present invention.

FIG. 15 is a schematic flow chart of the direction correcting method according to the present invention.

As shown in FIG. 15, the first and second distance detectors 2a, 2b detect first and second distances L1, L2 of the moving device 5 to the reference member 1 and generate first and second distance detecting signals while sending the first and second distance detecting signals to the control unit 3 (step S1).

An A/D converter 8 of the control unit 3 converts the first and second distance detecting signals from analog signals to digital signals (step S2), then the first and second distance detecting signals in digital signal format undertake "electric-photo-electric" conversion by the signal isolator 9, then the first and second distance detecting signals are sent from the signal isolator 9 to the MCU 10 (step S3). The MCU 10 determines whether the moving direction A deviates from the predetermined direction B using the first and second distance detecting signals (step S4), for example, the MCU 10 determines whether the moving direction A deviates or not and the deviation direction by comparison of the difference or ratio of the first and second distances. If L1 is larger than L2, for example, the moving direction A is determined to deviate toward right in FIGS. 1-3 while the MCU 10 calculates the deviation value generating a driving signal corresponding to the deviation value, here, the term of "deviation value" includes deviation direction. If the deviation value is a negative value, for example, the moving direction A deviates clockwise with respect to the predetermined direction B, conversely, if the deviation value is a positive value, the moving direction A deviates counterclockwise with respect to the predetermined direction B. Further, if the deviation value is larger than 1, for example, the moving direction A deviates clockwise with respect to the predetermined direction B, conversely, if the deviation value is less than 1, the moving direction A deviates counterclockwise with respect to the predetermined direction B.

Then, the driving signals of the MCU 10 are transmitted to the signal driver 11, which amplifies the driving signals from the MCU 10 and transmits the same to the driving circuit 12 (step S5).

Then, the motor 33 of the direction control device 4 is rotated by the driving circuit 12, for example, the driving motor 33 rotates counterclockwise with an angle corresponding to the deviation value, the motor 33 drives the first and second reels 37a, 37b to rotate, thus an end of the traction rope 32 is wound on, for example, the first reel 37a, and the other end of the traction rope 32 is unwound from, for example, the second reel 37b, and the steering wheel is driven to rotate an angle corresponding to the deviation value for correcting the moving direction A of the moving device 5 to the predetermined direction B (step S6).

When the moving direction A is consistent with the predetermined direction B, the flow ends (step S7). Otherwise, the flow chart returns to step S1.

Similarly, if the first distance L1 is less than the second distance L2, it is shown the moving direction A deviates toward left from the predetermined direction B in FIGS. 1-3, and the control unit 3 drives the motor 33 to rotate, for example, clockwise, so that the traction rope 32 rotates the steering wheel 13, which is similar to the operations for correcting the right deviation. Thus, the description thereof is hereby omitted.

It should be noted that, although FIG. 15 shows that the process will be ended if the moving direction A is consistent with the deviation predetermined direction, the determination whether the moving direction A deviates from the predetermined direction B can be done in real time. That is to say, the first and second distance detectors 2a, 2b can detect the first and second distances L1, L2 in real time. Alternatively, for example, if the reference member 1 shown in FIG. 3 is used, the first and second distance detectors 2a, 2b intermittently detect the first and second distances L1, L2, thus periodically determine whether the moving direction deviates from the predetermined direction B or not.

It should be noted that if the control unit 3 (MCU 10) determines that the moving direction A is not deviated from the predetermined direction B based on the first and second distance detecting signals, the control unit may not transmit driving signals toward the direction control device 4. In other words, it can also be deemed that the driving signals (driving current) transmitted from the control unit 3 toward the direction control device 4 are zero, then representing that there is no deviation. Therefore, those skilled in the art may appreciate that the control unit 3 can periodically control the direction control device 4 in real time to correct the moving direction A (when there is no deviation, the correction required is zero).

Additionally, those skilled in the art may appreciate that the deviation value between the moving direction A and the predetermined direction B can be set to a predetermined threshold, only when the absolute value of the deviation value is larger than the predetermined threshold, the control unit 3 controls the direction control device 4 to correct the moving direction of the moving device 5.

The movable radiation inspecting system according to another aspect of the present invention comprises the above direction correcting apparatus. As for other components of the movable radiation inspecting system, such as a radiation source, a detector array provided on a telescopic arm, an imaging system, and a control system etc., they are similar to those in prior art, the components thereof are integrated on the moving device 5 to form the scanning vehicle. For simple purpose, the descriptions on the other components of the movable radiation inspecting system and the operations thereof are hereby omitted.

While the embodiments of the present invention have been described by way of examples taken in conjunction with the accompanying drawings, it should be appreciated that modifications, additions and variations to and from the above described embodiments may be made without deviating from the scope of the present invention which is defined by the accompanying claims.

What is claimed is:

1. A direction correcting apparatus for a movable radiation inspecting system having a moving device, comprising:
    a direction detecting device for detecting a moving direction of the moving device and generating a detecting signal indicating the moving direction;
    a direction control device for controlling the moving direction of the moving device; and
    a control unit for calculating a deviation value between the moving direction and the predetermined direction based on the detected signal received from the direction detecting device, and the direction control device is driven according to the deviation value to correct the moving direction to the predetermined direction.

2. The direction correcting apparatus according to claim 1, wherein the direction detecting device comprises first and second distance detectors, which generate first and second distance detecting signals respectively, and wherein the control unit calculates the deviation value based on the first and second distance detecting signals.

3. The direction correcting apparatus according to claim 2, wherein the first and second distance detectors detect first and second distances between the moving device and the object to be inspected.

4. The direction correcting apparatus according to claim 3, further comprising a reference member, wherein the first and second detectors detect the first and second distances between the moving device and the reference member.

5. The direction correcting apparatus according to claim 2, wherein the first and second distance detectors comprise distance measuring laser sensors.

6. The direction correcting apparatus according to claim 2, wherein the control unit comprises:
- an analog/digital converter which converts analog signals of the first and second distance detecting signals into digital signals;
- a processor which calculates the deviation value based on the first and second distance detecting signals being converted into digital signals to generate a driving signal corresponding to the deviation value;
- a signal driver for receiving and amplifying the driving signal; and
- a driving circuit for driving the direction control device based on the amplified driving signal received from the signal driver, to correct the moving direction of the moving device.

7. The direction correcting apparatus according to claim 6, wherein the control unit further comprises a signal isolator connected between an output of the analog/digital converter and an input of the processor to isolate input signals inputted therein and output signals outputted therefrom.

8. The direction correcting apparatus according to claim 7, wherein the signal isolator comprises a photoelectric isolator.

9. The direction correcting apparatus according to claim 8, wherein the processor comprises a MCU.

10. The direction correcting apparatus according to claim 1, wherein the direction control device comprises:
- a steering wheel for controlling the moving direction of the moving device; and
- an actuator detachably engaged with the steering wheel and driven by the control unit, to rotate the steering wheel so that the moving direction of the moving device is controlled.

11. The direction correcting apparatus according to claim 10, wherein the direction control device further comprises a connecting mechanism, of which an end is connected with the actuator and the other end is detachably engaged with the steering wheel of the moving device.

12. The direction correcting apparatus according to claim 11, wherein the connecting mechanism comprises:
- a connecting rod, of which an end is connected to the actuator;
- a post, the other end of the connecting rod is connected to the post with a joint bearing, and a top end of the post is provided with a nut for positioning the connecting rod; and
- an installing plate, the post is provided at a top face of the installing plate, a side of the installing plate is detachably engaged with the outer periphery of the steering wheel to rotate the steering wheel.

13. The direction correcting apparatus according to claim 12, wherein the direction control device further comprises a bracket and a cross-shaped block, the cross-shaped block hinges with the bracket to form a gimbal, and the actuator is provided to the bracket by the cross-shaped block.

14. The direction correcting apparatus according to claim 13, wherein the direction control device further comprises:
- a supporting plate on which the bracket is provided;
- a shielding switch provided on the supporting plate; and
- a pressing plate connected to the gimbal so that the pressing plate bumps against the shielding switch to power off the actuator when the actuator and the connecting mechanism both are detached from the steering wheel.

15. The direction correcting apparatus according to claim 10, wherein the actuator comprises:
- a motor driven by the control unit;
- a worm wheel connected with an output shaft of the motor; and
- a worm engaged with the worm wheel, and an axial end of the worm is connected with the connecting mechanism.

16. The direction correcting apparatus according to claim 10, wherein the actuator comprises a hydraulic cylinder driven by the control unit and a cylinder rod thereof is connected with the connecting mechanism.

17. The direction correcting apparatus according to claim 10, wherein the actuator comprises a gas cylinder driven by the control unit and a cylinder rod thereof is connected with the connecting mechanism.

18. The direction correcting apparatus according to claim 1, wherein the direction control device comprises:
- a transmitting device driven by the control unit; and
- a flexible traction member, both ends of the flexible traction member are turned around the steering wheel, connecting to the transmitting device respectively.

19. The direction correcting apparatus according to claim 18, wherein the flexible traction member is a traction rope.

20. The direction correcting apparatus according to claim 19, wherein the traction rope is detachably engaged into a groove at the outer periphery of the steering wheel by a clipping plate and screws.

21. The direction correcting apparatus according to claim 20, wherein the transmitting device comprises:
- a motor driven by the control unit; and
- a decelerator having two output shafts driven by the motor, both ends of the traction rope are connected with the two output shafts of the decelerator having two output shafts.

22. The direction correcting apparatus according to claim 21, wherein the transmitting device further comprises:
- first and second couplings, input sides of the first and second couplings are connected with two output shafts of the decelerator;
- first and second reel shafts connected with the output sides of the first and second couplings and supported by first and second supporting bases; and
- first and second reels respectively provided on the first and second reel shafts, wherein both ends of the traction rope are wound around the first and second reels respectively.

23. The direction correcting apparatus according to claim 22, wherein the transmitting device further comprises first and second adjusting devices for adjusting tensioning degree of the traction rope.

24. The direction correcting apparatus according to claim 23, wherein the transmitting device further comprises first and second overrunning clutches provided in the first and second couplings.

25. The direction correcting apparatus according to claim 24, wherein the overrunning clutches comprise inner teeth ratchet overrunning clutches.

26. The direction correcting apparatus according to claim 4, wherein the reference member comprises an integral flat plate piece provided parallel to the predetermined direction.

27. The direction correcting apparatus according to claim 4, wherein the reference member comprises a plurality of flat plate segments, which are spaced apart parallel to the predetermined direction and arranged in alignment.

28. The direction correcting apparatus according to claim 1, wherein the direction detecting device comprises at least a photoelectric switch, wherein the control unit controls the distance between the moving device and the object to be inspected within a predetermined distance based on the signals received from the at least one photoelectric switch.

29. The direction correcting apparatus according to claim 28, wherein there are two photoelectric switches.

30. The direction correcting apparatus according to claim 29, wherein the control unit comprises:
 a signal collector transmitter for collecting signals from the first and second distance detectors and the photoelectric switch; and
 a signal receiver for wirelessly receiving the signals transmitted from the signal collector transmitter.

31. A movable radiation inspecting system, comprising the direction correcting apparatus according to claim 1.

32. A direction correcting method for correcting a moving direction of a movable radiation inspecting system which has a moving device, the direction correcting method comprising steps of:
 detecting step of detecting a moving direction of the moving device and generating detecting signals indicating the moving direction; and
 calculating step of calculating a deviation value between the moving direction and a predetermined direction based on the detected signals, and automatically correcting the moving direction to the predetermined direction based on the deviation value.

33. The direction correcting method according to claim 32, wherein:
 the detecting step comprising: detecting first and second distances between the moving device and the object to be inspected, to generate first and second distance detecting signal; and
 the calculating step comprising: calculating the deviation value between the moving direction and the predetermined direction of the moving device based on the first and second distance detecting signals, and automatically correcting the moving direction to the predetermined direction based on the deviation value.

34. The direction correcting method according to claim 32, wherein the detecting step comprising: detecting first and second distances between the moving device and a reference member, to generate first and second distance detecting signal; and
 the calculating step comprising: calculating the deviation value between the moving direction and the predetermined direction of the moving device based on the first and second distance detecting signals, and automatically correcting the moving direction to the predetermined direction based on the deviation value.

35. The direction correcting method according to claim 33, wherein the first and second distances are measured with distance measuring laser sensors.

36. The direction correcting method according to claim 32, wherein the calculating step is accomplished by a control unit and a direction control device,
 wherein the direction control device controls the moving direction of the movable radiation inspecting system; and
 the control unit comprises:
 an analog/digital converter which converts analog signals of the first and second distance detecting signals into digital signals;
 a processor which calculates the deviation value based on the first and second distance detecting signals converted into digital signals to generate driving signals corresponding to the deviation value;
 a signal driver for receiving and amplifying the driving signal; and
 a driving circuit for driving the direction control device based on the amplified driving signal received from the signal driver, to correct the moving direction of the moving device.

37. The direction correcting method according to claim 36, wherein the control unit further comprises a signal isolator connected between an output of the analog/digital converter and an input of the processor to isolate input signals inputted therein and output signals outputted therefrom.

38. The direction correcting method according to claim 37, wherein the signal isolator comprises a photoelectric isolator.

39. The direction correcting method according to claim 34, further comprising:
 controlling step of automatically controlling a distance between the moving device and the object to be inspected by at least one photoelectric switch to a predetermined distance.

* * * * *